(12) United States Patent
Thompson et al.

(10) Patent No.: US 12,017,761 B2
(45) Date of Patent: Jun. 25, 2024

(54) ROTOR CENTRIFUGAL FORCE RETENTION DEVICE

(71) Applicant: Bell Textron Inc., Fort Worth, TX (US)

(72) Inventors: George Matthew Thompson, Lewisville, TX (US); Jonathan Andrew Knoll, Burleson, TX (US); Nicholas Carlson, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 426 days.

(21) Appl. No.: 16/846,371

(22) Filed: Apr. 12, 2020

(65) Prior Publication Data

US 2021/0316849 A1 Oct. 14, 2021

(51) Int. Cl.
| | |
|---|---|
| *B64C 27/33* | (2006.01) |
| *B64C 11/06* | (2006.01) |
| *B64C 27/48* | (2006.01) |
| B64C 27/10 | (2023.01) |
| B64U 10/13 | (2023.01) |
| B64U 30/20 | (2023.01) |
| B64U 50/14 | (2023.01) |

(52) U.S. Cl.
CPC .............. *B64C 27/33* (2013.01); *B64C 27/48* (2013.01); *B64C 11/06* (2013.01); *B64C 27/10* (2013.01); *B64U 10/13* (2023.01); *B64U 30/20* (2023.01); *B64U 50/14* (2023.01)

(58) Field of Classification Search
CPC ......... B64C 11/02; B64C 11/06; B64C 11/14; B64C 27/33; B64C 27/48
See application file for complete search history.

(56) References Cited

U.S. PATENT DOCUMENTS

| | | | | |
|---|---|---|---|---|
| 5,286,167 A | * | 2/1994 | Byrnes | B64C 27/33 |
| | | | | 416/135 |
| 5,645,400 A | * | 7/1997 | Hunter | B64C 27/33 |
| | | | | 416/134 A |
| 6,216,979 B1 | * | 4/2001 | Faure | B64C 27/32 |
| | | | | 244/17.11 |
| 8,801,378 B2 | * | 8/2014 | Baskin | B64C 11/06 |
| | | | | 416/135 |
| 9,057,273 B2 | * | 6/2015 | Wang | B64C 11/04 |
| 9,505,489 B2 | * | 11/2016 | Sutton | B64C 11/02 |
| 2018/0148166 A1 | | 5/2018 | Darrow, Jr. et al. | |
| 2021/0316849 A1 | * | 10/2021 | Thompson | B64C 29/0033 |

* cited by examiner

*Primary Examiner* — Christopher R Legendre

(74) *Attorney, Agent, or Firm* — Lightfoot & Alford PLLC

(57) ABSTRACT

A rotor blade retention device for use in an aircraft having a plurality of blades includes an array of cavities, each cavity adapted to receive a portion of a tension-torsion strap therein. Each cavity is oriented such that, when the portion of the tension-torsion strap is received therein, a central plane of the tension-torsion strap is inclined relative to a blade plane of rotation defined by the plurality of blades. The retention device may have a body that defines an aperture adapted to receive a portion of a rotor mast of the aircraft, may comprise a rotor mast of the aircraft, or may comprise first and second plates that cooperate to form the array of cavities and that are adapted to receive a portion of the rotor mast of the aircraft.

10 Claims, 11 Drawing Sheets

ROTOR CENTRIFUGAL FORCE RETENTION DEVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Ducted-rotor aircraft have at least one ducted rotor for providing lift and propulsion forces. A ducted rotor for such an aircraft typically has internal structure that supports a motor of the aircraft, and an aerodynamic exterior skin. One or more ducted rotors may be rotatably coupled to a fuselage of such an aircraft. Each rotor typically has a plurality of blades that are configured to rotate within a corresponding duct.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Rotor blade retention devices are disclosed herein for use in an aircraft having a plurality of blades, such as a ducted-rotor aircraft. It is desirable to minimize the number of separate components that make up a ducted-rotor aircraft, not only to limit the weight of the aircraft, but further to limit complexity and cost of the aircraft.

Figure 1:
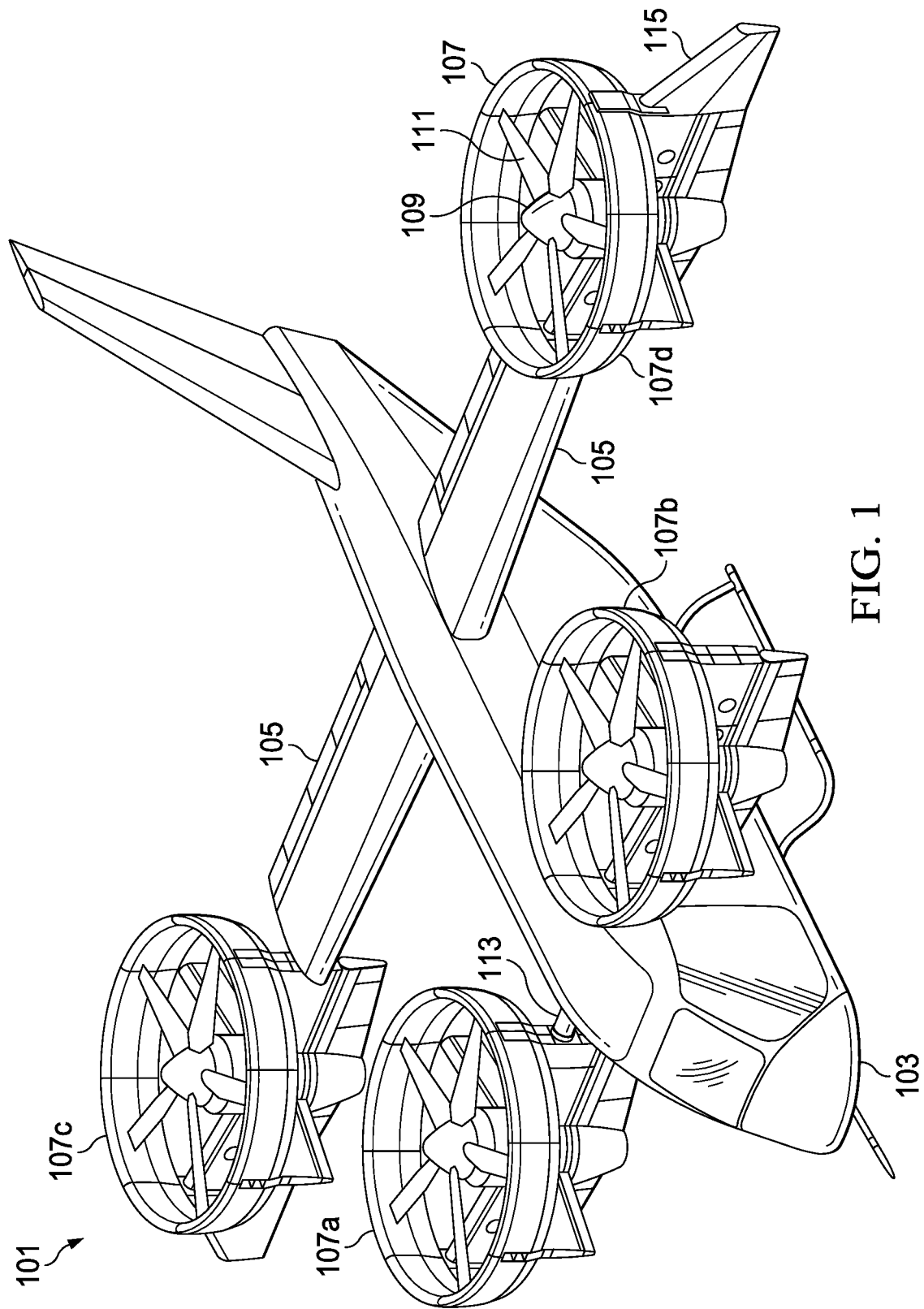
FIG. 1 is an oblique view of an aircraft with ducted rotors, the ducted rotors positioned for the aircraft to operate in a helicopter mode.
Figure 2:
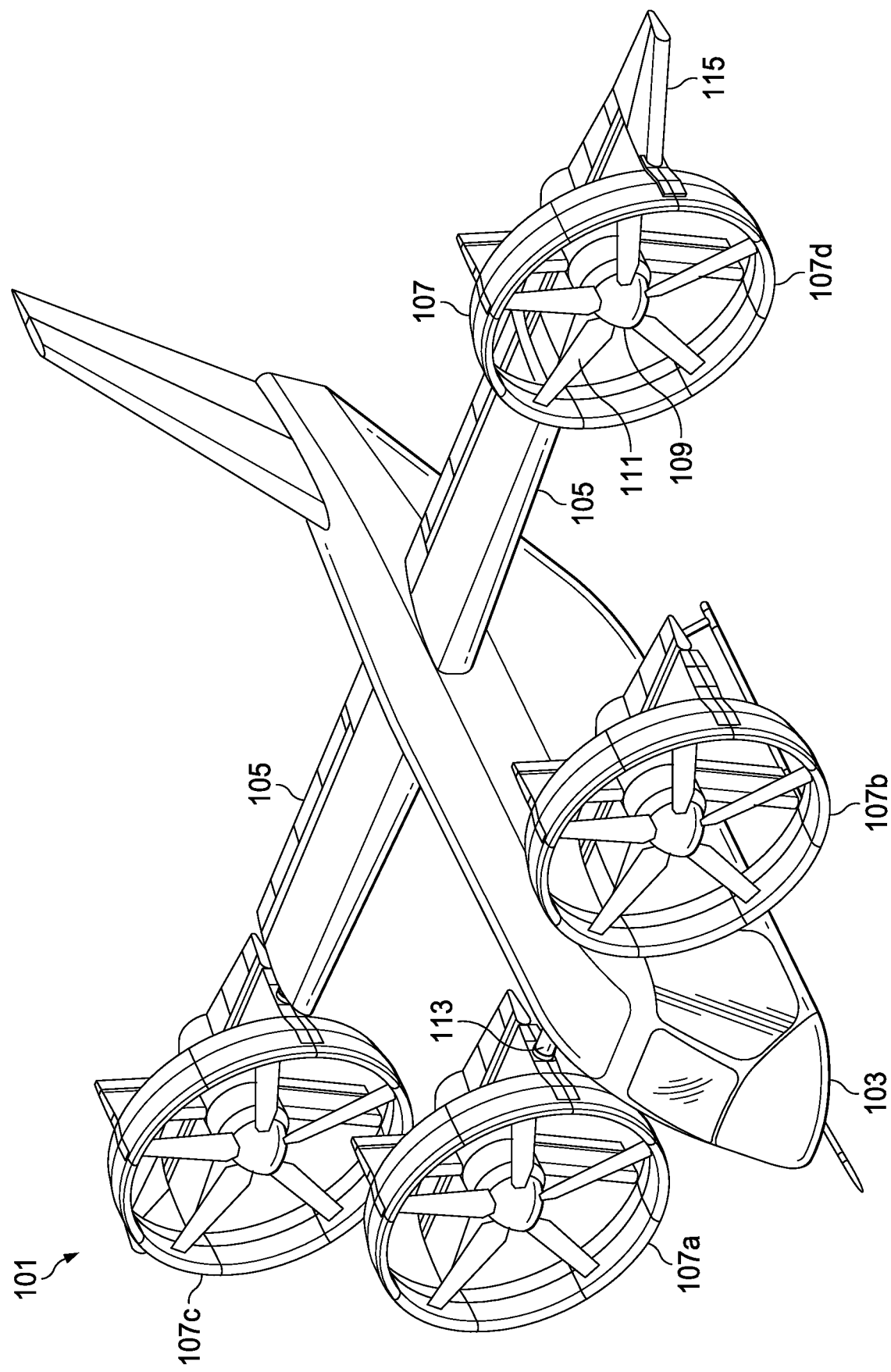
FIG. 2 is an oblique view of the aircraft depicted in FIG. 1, the ducted rotors positioned for the aircraft to operate in an airplane mode.

FIGS. 1 and 2 are oblique views of a ducted-rotor aircraft 101. Aircraft 101 comprises a fuselage 103 with a fixed wing 105 that extends therefrom and a plurality of pivotable ducts 107. Each duct 107 houses a power plant for driving an attached rotor 109 in rotation. Each rotor 109 has a plurality of blades 111 configured to rotate within a corresponding duct 107.

One or both of the position of ducts 107 and the pitch of blades 111 can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight.

In this embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a first spindle 113. Ducts 107c and 107d are each rotatably coupled to a corresponding end of wing 105 via respective discrete spindles (not shown). As shown, ducts 107c and 107d each include a winglet 115 that is coupled thereto. It should be appreciated that aircraft 101 is not limited to the illustrated configuration having four ducts 107, and that aircraft 101 may alternatively be implemented with more or fewer ducts 107.

Figure 3:
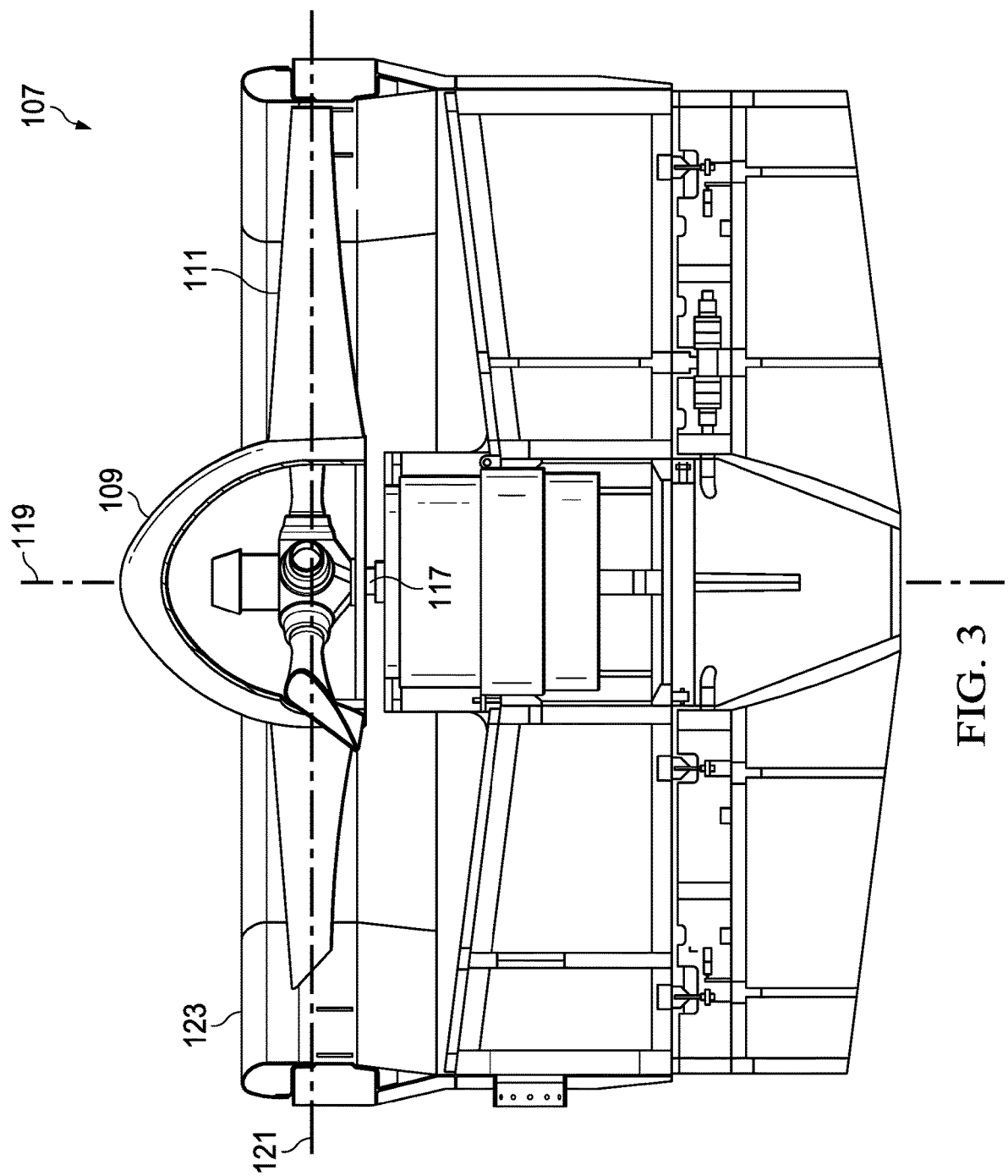
FIG. 3 is a cross-sectional view of a duct of the aircraft depicted in FIGS. 1 and 2.

FIG. 3 is a cross-sectional view of a duct 107 of aircraft 101. Each rotor 109 includes a rotor mast 117 that is adapted to rotate about a mast axis 119. Blades 111 of rotor 109 are coupled to rotor mast 117 for rotation therewith about mast axis 119. As shown, rotor 109 is located within duct 107 such that blades 111 define a blade plane of rotation 121 within a duct ring 123 of duct 107. Blade plane of rotation 121 is perpendicular to mast axis 119.

Figure 4:
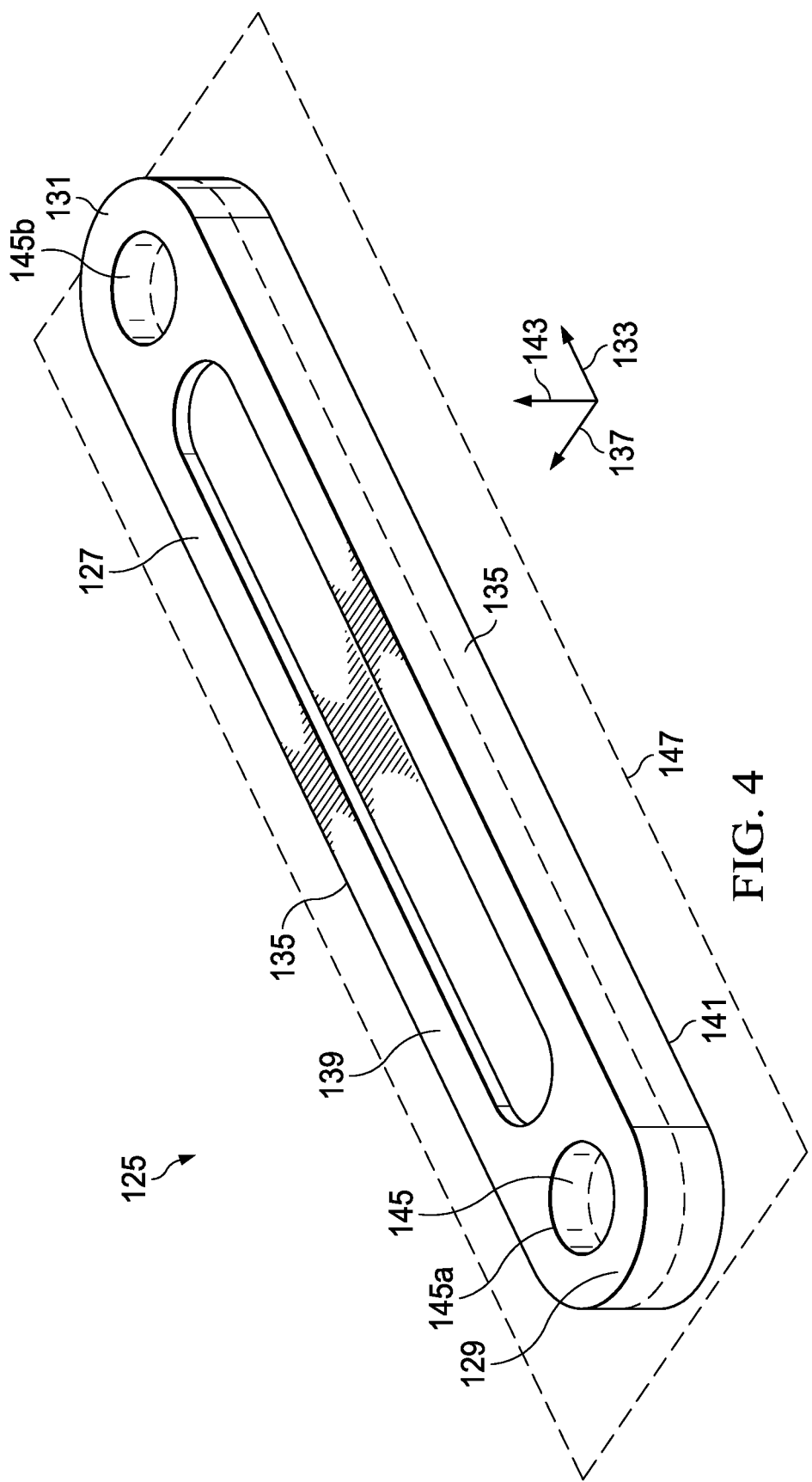
FIG. 4 is an oblique view of a tension-torsion strap component that may be installed in the ducted rotors of the aircraft depicted in FIGS. 1 and 2.

FIG. 4 is an oblique view of a tension-torsion strap 125. Strap 125 is adapted to react centrifugal forces generated by blades 111 of rotor 109 while also allowing for pitch change of blades 111 and rotation of an outboard portion of strap 125. Strap 125 has a body 127 that extends from a first end 129 to a second end 131 along a first direction 133, extends between opposed sides 135 along a second direction 137 that is perpendicular to first direction 133, and extends between an upper surface 139 and an opposed lower surface 141 along a third direction 143 that is perpendicular to both first direction 133 and second direction 137. Body 127 has a pair of reinforced grommets 145, each grommet 145 adapted to receive a fastener. As shown, a first grommet 145a of the pair extends through body 127 along third direction 143 near first end 129 thereof, and a second grommet 145b of the pair extends through body 127 along third direction 143 near second end 131 thereof.

For the purposes of describing how one or more straps 125 are oriented relative to one or more other components of aircraft 101, a central plane 147 of strap 125 is defined herein. As shown, central plane 147 extends parallel to both first direction 133 and second direction 137 through body 127 at a central location between upper surface 139 and lower surface 141. It should be appreciated that strap 125 is not limited to the illustrated geometry of body 127.

Figure 5:
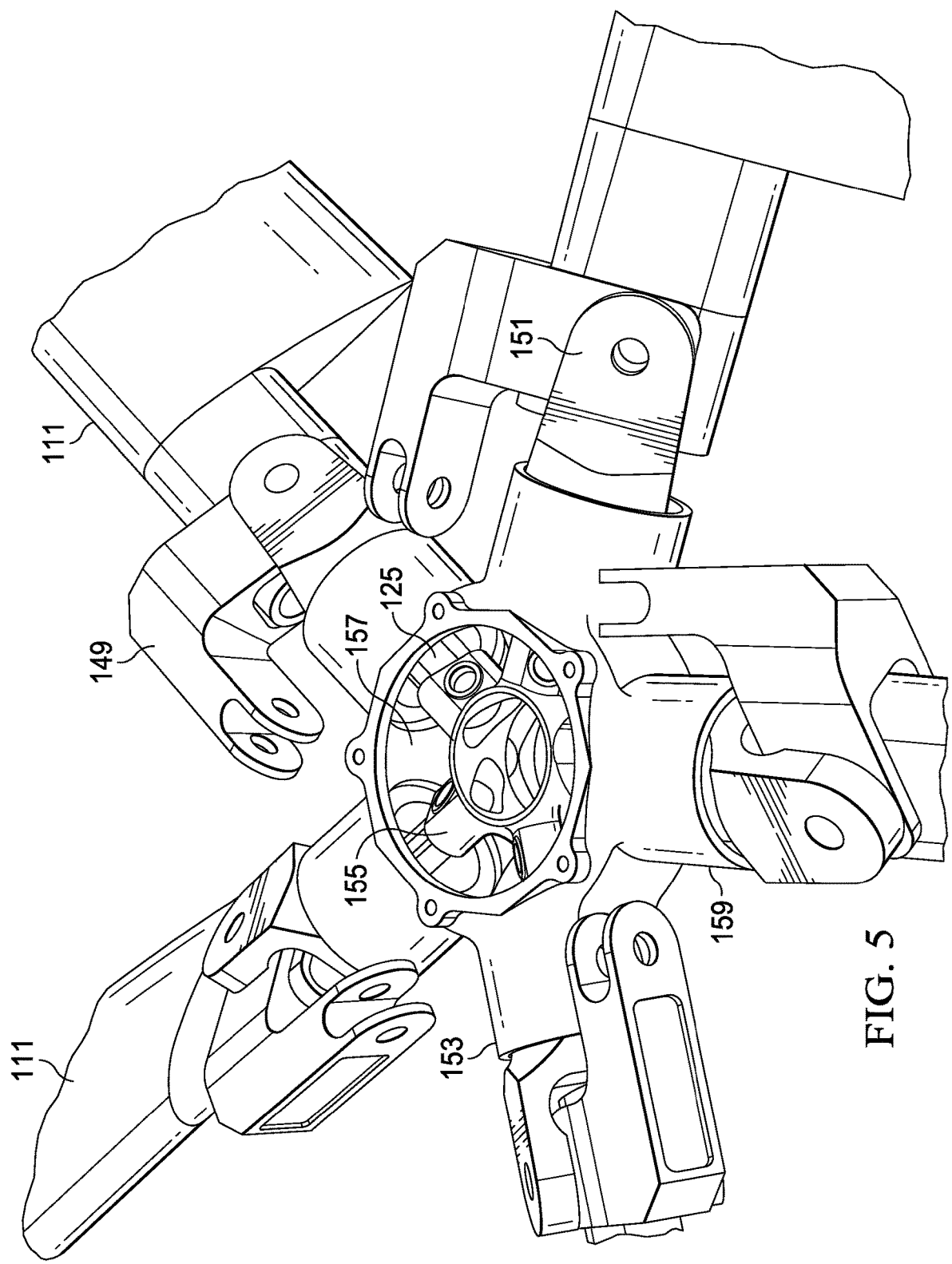
FIG. 5 is an oblique view of rotor components, including a rotor blade retention device according to this disclosure, of the aircraft depicted in FIGS. 1 and 2.

FIG. 5 is an oblique view of components of rotor 109 of aircraft 101. Illustrated components include a plurality of pitch horns 149, a plurality of blade grips 151, a yoke 153, a plurality of straps 125, and a rotor blade retention device 155. A plurality of straps 125 are installed in each rotor 109 of aircraft 101. Yoke 153 includes a central cavity 157 and a plurality of tubular protrusions 159 arranged in a radial array. Protrusions 159 are hollow and open to cavity 157. Each pitch horn 149 is adapted to be received on a respective blade 111 for pitch adjustment thereof via a pitch link and a pitch-change mechanism (both not shown) that is coupled to pitch horn 149. Each blade grip 151 is adapted to be pivotally coupled to a corresponding blade 111 and pitch horn 149, and to be rotatably coupled within a corresponding protrusion 159 of yoke 153. As shown, retention device 155 is adapted to be installed within cavity 157 of yoke 153.

Figure 6:
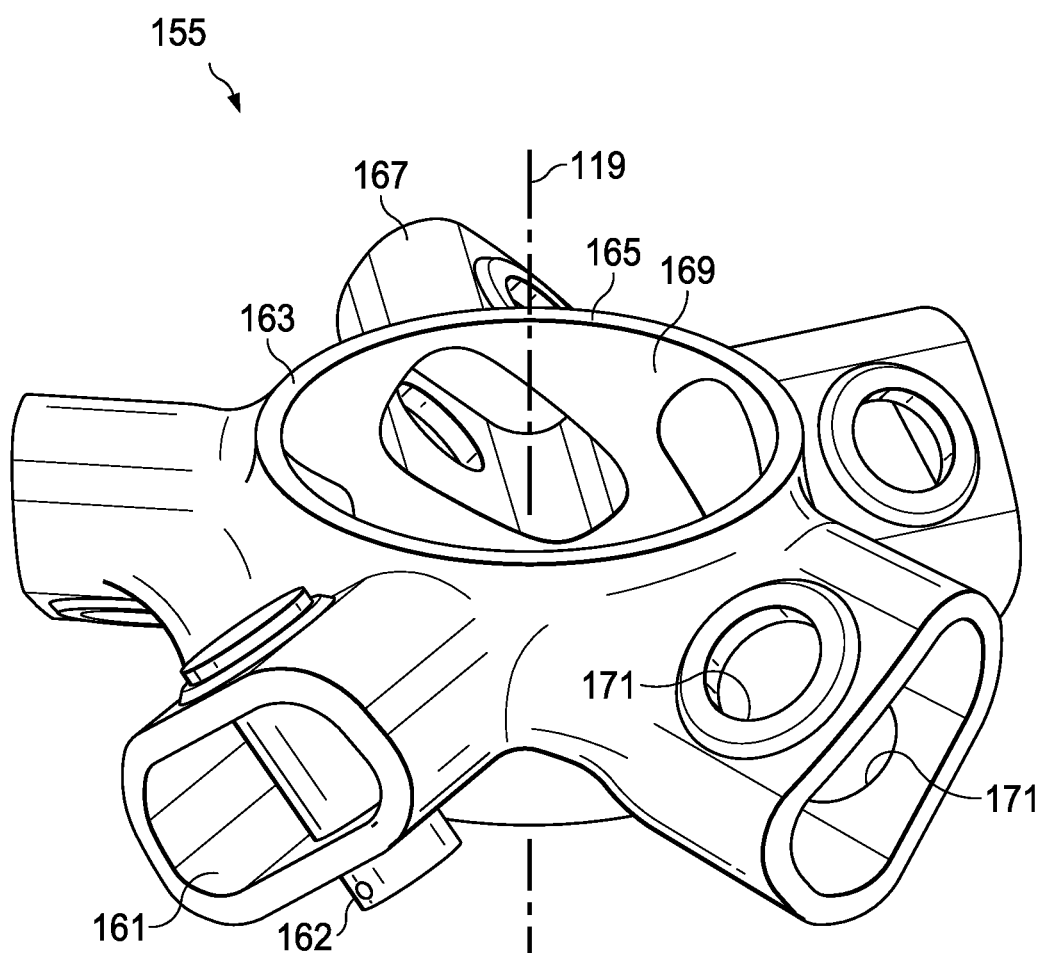
FIG. 6 is an oblique view of the rotor blade retention device depicted in FIG. 5.
Figure 7:
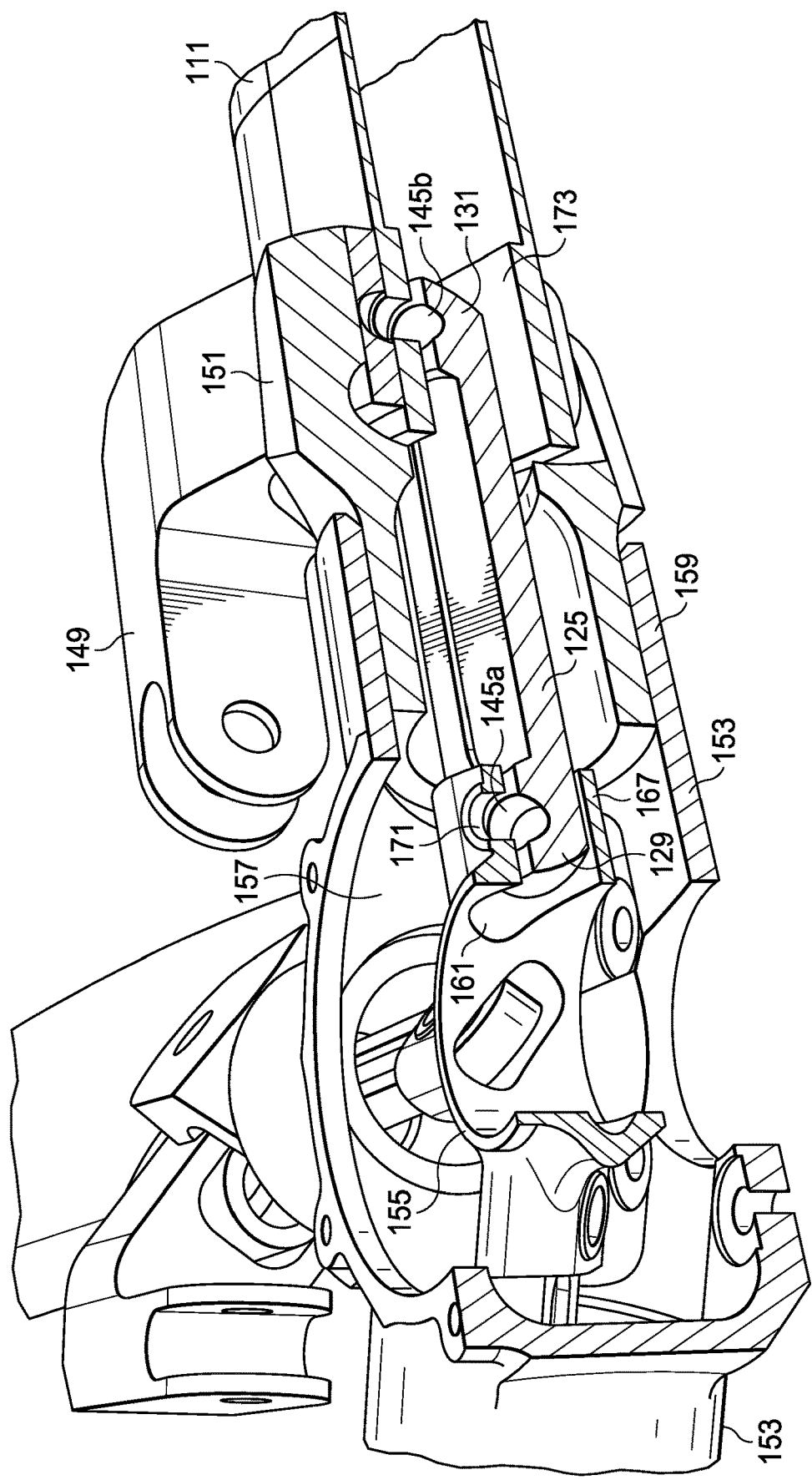
FIG. 7 is an oblique cross-sectional view of the rotor components depicted in FIG. 5.

FIG. 6 is an oblique view of retention device 155. FIG. 7 is an oblique cross-sectional view of components of rotor 109 of aircraft 101 including retention device 155. In this embodiment, retention device 155 comprises a plurality of cavities 161 arranged in a radial array. Each cavity 161 is adapted to receive a portion of a strap 125, such as first end 129 or second end 131, therein. As shown, each cavity 161 is oriented such that, when a strap 125 is installed therein, central plane 147 of strap 125 is inclined relative to blade plane of rotation 121 (for example as shown in FIG. 7). It should be appreciated that retention device 155 is not limited to the illustrated orientation of cavities 161, and thus the angle formed between central plane 147 of strap 125 and blade plane of rotation 121 may be larger or smaller. It should further be appreciated that while cavities 161 are oriented identically relative to blade plane of rotation 121, that the configuration of retention device 155 is not so limited. For example, retention device 155 may be alternatively configured such that one or more cavities 161 form different angles, relative to each other, between central plane 147 of strap 125 and blade plane of rotation 121.

Retention device 155 has a body 163 that includes a central portion 165 and a plurality of protrusions 167 that extend outward from central portion 165. As shown, protrusions 167 are arranged in a radial array around central portion 165 and are spaced equally apart from one another. Each protrusion 167 defines a respective cavity 161. As shown, body 163 is a one-piece body, such that protrusions 167 are integral with central portion 165. It should be appreciated that retention device 155 is not limited to a one-piece body. For example, retention device 155 may be alternatively configured with a central portion and discrete protrusions that are attachable to the central portion. It should further be appreciated that, alternatively, protrusions 167 may be unequally spaced from one another in the array.

In this embodiment, central portion 165 is adapted to be carried by rotor mast 117 for coaxial rotation therewith about mast axis 119. In particular, central portion 165 defines an aperture 169 that extends therethrough and that is coaxial with mast axis 119 with rotor mast 117 received in aperture 169. In the embodiment shown, aperture 169 is sized such that retention device 155 creates an interference fit with rotor mast 117 when rotor mast 117 is received in aperture 169. Stated differently, body 163 is adapted to create an interference fit with rotor mast 117 of aircraft 101 with rotor mast 117 received in aperture 169. It should be appreciated that retention device 155 can be alternatively configured to be retained on rotor mast 117 by other means, such as, for example, fasteners. In another alternative example, retention device 155 may have splines formed on an interior of aperture 169 for engaging complementary splines formed on rotor mast 117.

Each cavity 161 is configured to receive a fastener, for example a clevis pin 162, that extends therethrough for retaining strap 125 in place within cavity 161. In this embodiment, each protrusion 167 defines a pair of openings 171, each opening 171 located on an opposed side of cavity 161. As shown, cavities 161 are open to aperture 169. Retention device 155 may alternatively be referred to as a retention component. It should be appreciated that retention device 155 is not limited to the configuration of body 163 illustrated and described herein. For example, body 163 may be alternatively configured without protrusions 167, such that cavities 161 are formed as internal pockets in body 163.

As shown in FIG. 7, each blade 111 may define a hollow portion 173 near a root thereof. Hollow portion 173 is adapted to receive a portion of strap 125 therein. Strap 125 is depicted in an inserted position relative to cavity 161 and hollow portion 173 of blade 111. More specifically, first end 129 of strap 125 is inserted in cavity 161 such that first grommet 145a is aligned with openings 171 such that a fastener may be received therethrough to retain strap 125 within retention device 155. Furthermore, second end 131 is inserted in hollow portion 173 such that second grommet 145b is aligned with complementary openings that extend through blade grip 151, pitch horn 149, and hollow portion 173 such that a fastener may be received therethrough to retain strap 125 in place. Retention device 155 may be provided, along with a plurality of straps 125, as a rotor blade retention assembly of aircraft 101.

Figure 8:
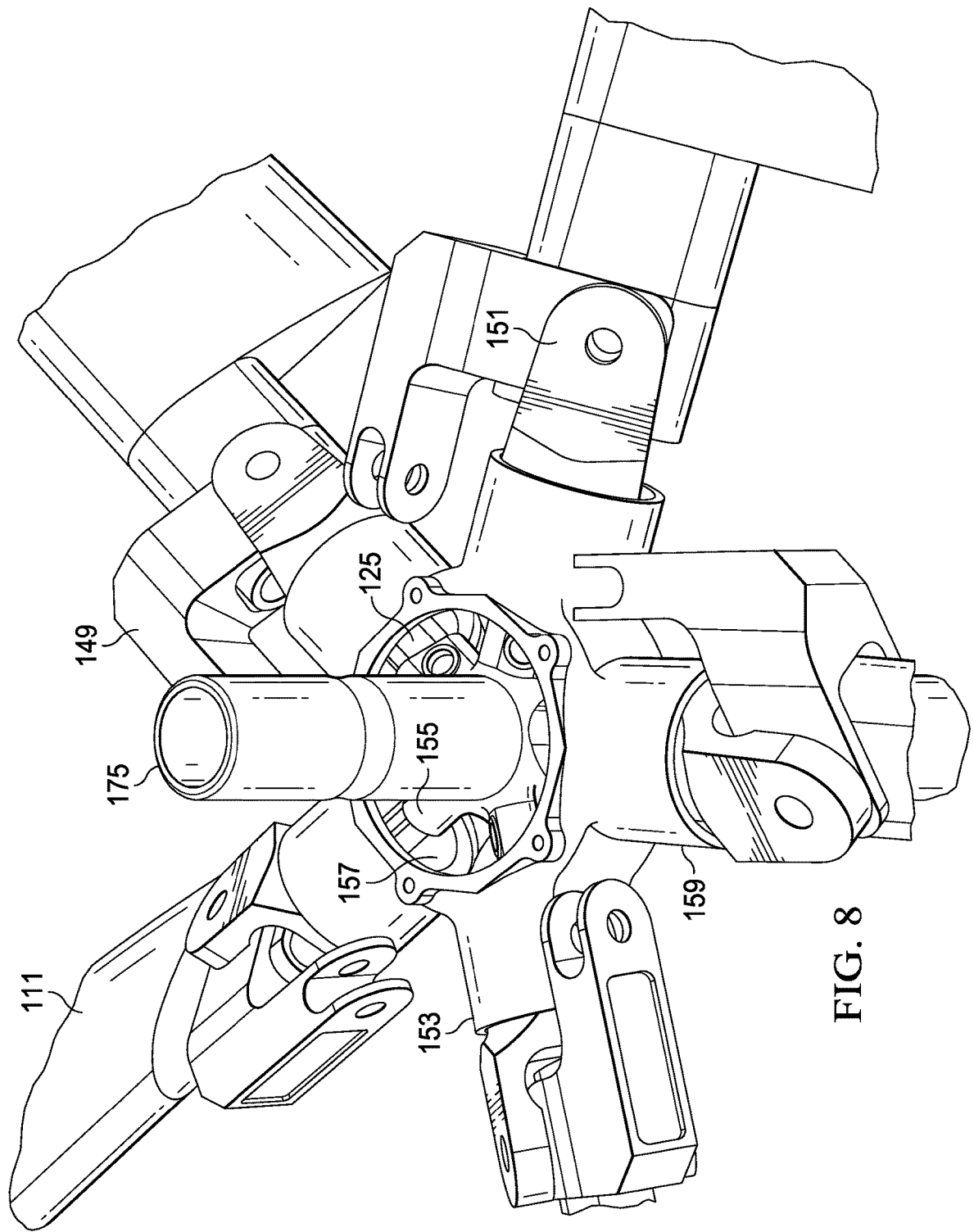
FIG. 8 is an oblique view of rotor components, including an alternative embodiment of a rotor blade retention device, according to this disclosure, of the aircraft depicted in FIGS. 1 and 2.

FIG. 8 is an oblique view of components configured for use with rotor 109 of aircraft 101. Illustrated components include plurality of pitch horns 149, plurality of blade grips 151, yoke 153, plurality of straps 125, and an alternative embodiment of a rotor blade retention device 175. As shown, retention device 175 is adapted to be implemented in aircraft 101 in lieu of rotor mast 117.

Figure 9:
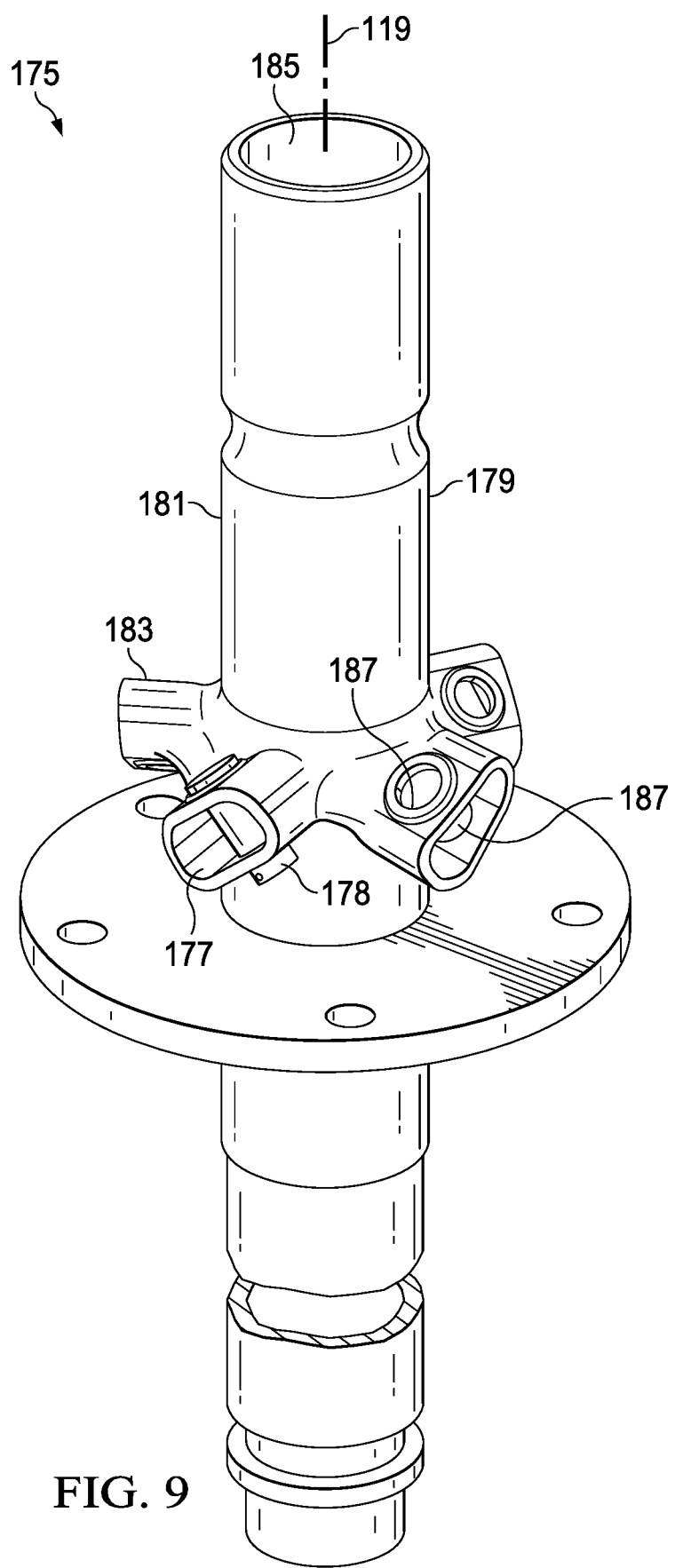
FIG. 9 is an oblique view of the rotor blade retention device depicted in FIG. 8.
Figure 10:
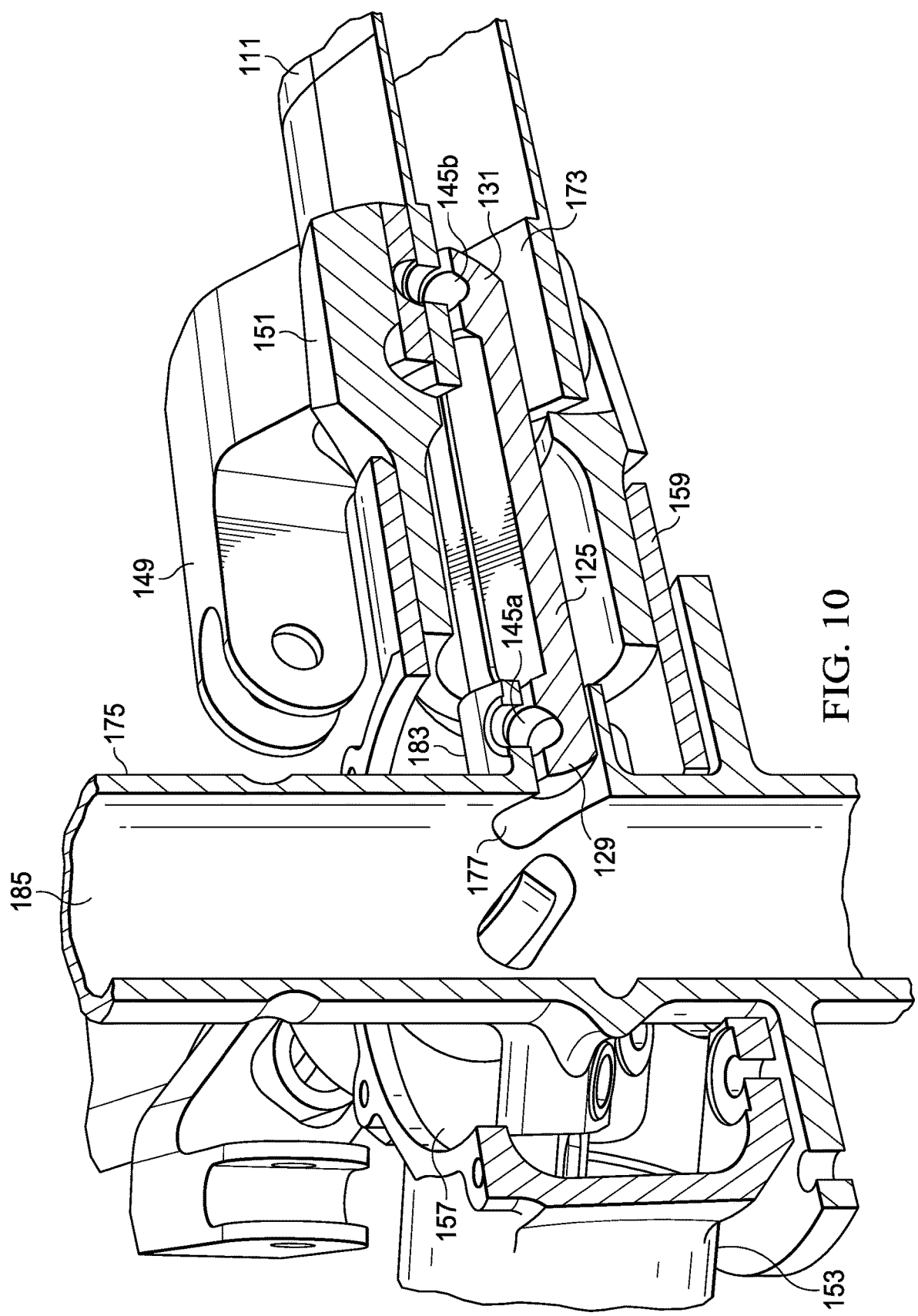
FIG. 10 is an oblique cross-sectional view of the rotor components depicted in FIG. 8.

FIG. 9 is an oblique view of retention device 175. FIG. 10 is an oblique cross-sectional view of components of rotor 109 of aircraft 101 including retention device 175. In this embodiment, retention device 175 comprises a plurality of cavities 177 arranged in a radial array. Each cavity 177 is adapted to receive a portion of a strap 125, such as first end 129 or second end 131, therein. As shown, each cavity 177 is oriented such that, when a strap 125 is installed therein, central plane 147 of strap 125 is inclined relative to blade plane of rotation 121 (for example as shown in FIG. 10). It should be appreciated that retention device 175 is not limited to the illustrated orientation of cavities 177, and thus the angle formed between central plane 147 of strap 125 and blade plane of rotation 121. It should further be appreciated that while plurality of cavities 177 are oriented identically relative to blade plane of rotation 121, that the configuration of retention device 175 is not so limited. For example, retention device 175 may be alternatively configured such that one or more cavities 177 form different angles, relative to each other, between central plane 147 of strap 125 and blade plane of rotation 121.

Retention device 175 has a body 179 that includes a central portion 181 and a plurality of protrusions 183 that extend outward from central portion 181. As shown, protrusions 183 are arranged in a radial array around central portion 181 and are spaced equally apart from one another. Each protrusion 183 defines a respective cavity 177. As shown, body 179 is a one-piece body, such that protrusions 183 are integral with central portion 181. It should be appreciated that retention device 175 is not limited to a one-piece body. For example, retention device 175 may be alternatively configured with a central portion and discrete protrusions that are attachable to the central portion. It should further be appreciated that, alternatively, protrusions 183 may be unequally spaced from one another in the array.

In this embodiment, central portion 181 is adapted as a rotor mast for implementation in aircraft 101 in lieu of rotor mast 117. Central portion 181 is configured as a shaft centered that is coaxial with mast axis 119, the shaft having a hollow passage 185 that extends therethrough.

Each cavity 177 is configured to receive a fastener, for example a clevis pin 178, that extends therethrough for retaining strap 125 in place within cavity 177. In this embodiment, each protrusion 183 defines a pair of openings 187, each opening 187 located on an opposed side of cavity 177. As shown, cavities 177 are open to passage 185. Retention device 175 may alternatively be referred to as a retention component. It should be appreciated that retention device 175 is not limited to the configuration of body 179 illustrated and described herein. For example, body 179 may be alternatively configured without protrusions 183, such that cavities 177 are otherwise formed as internal pockets in body 179.

In FIG. 10, strap 125 is depicted in an inserted position relative to cavity 177 and hollow portion 173 of blade 111. More specifically, first end 129 of strap 125 is inserted in cavity 177 such that first grommet 145a is aligned with openings 187 such that a fastener may be received therethrough to retain strap 125 within retention device 175. Furthermore, second end 131 is inserted in hollow portion 173 such that second grommet 145b is aligned with the complementary openings that extend through blade grip 151, pitch horn 149, and hollow portion 173 such that a fastener may be received therethrough to retain strap 125 in place. Retention device 175 may be provided, along with a plurality of straps 125, as a rotor blade retention assembly of aircraft 101.

Figure 11:
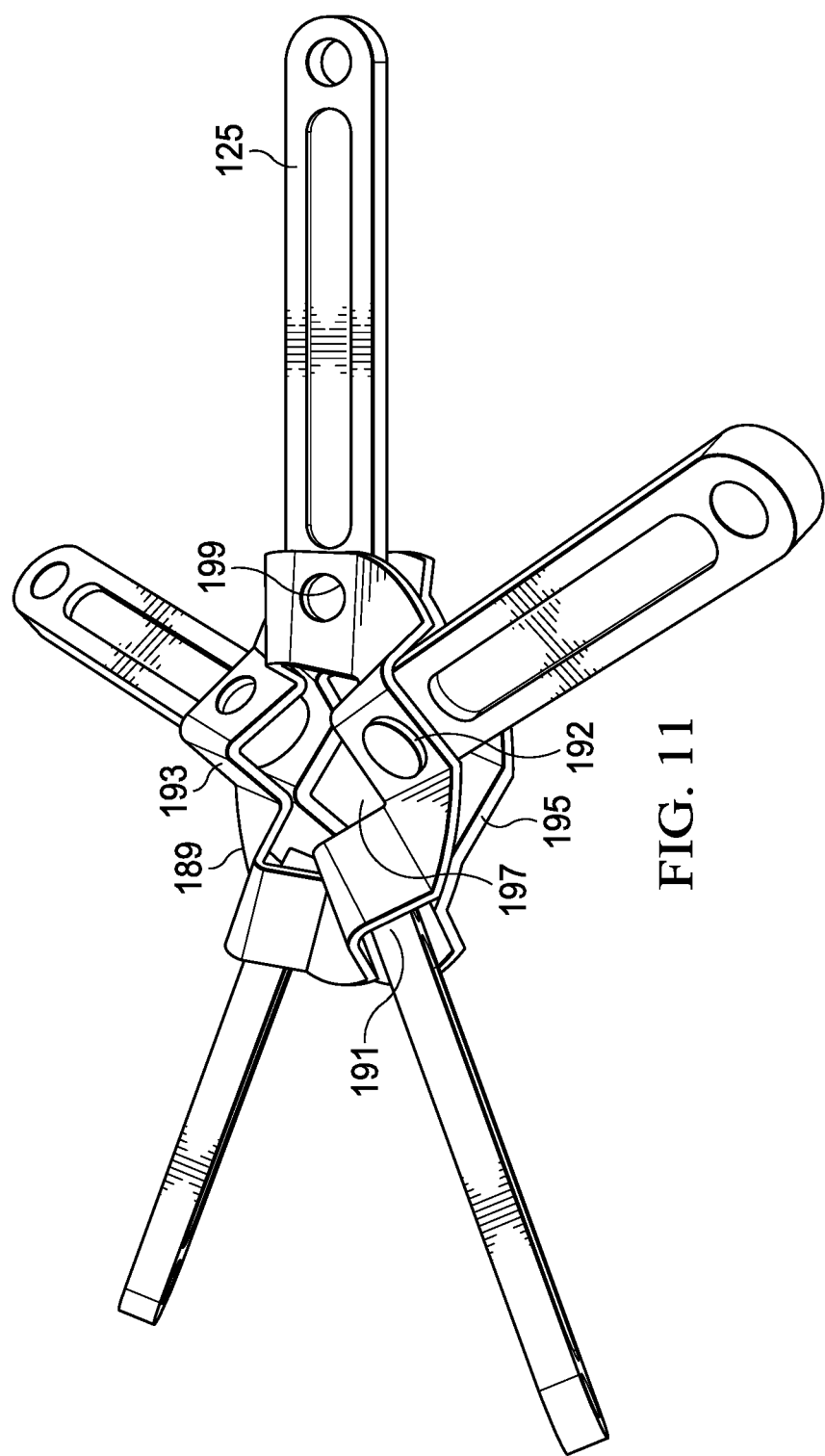
FIG. 11 is an oblique view of another alternative embodiment of a rotor blade retention device, according to this disclosure, of the aircraft depicted in FIGS. 1 and 2.

FIG. 11 is an oblique view of another alternative embodiment of a rotor blade retention device 189 for use with aircraft 101. In this embodiment, retention device 189 comprises a plurality of cavities 191 arranged in a radial array. Cavities 191 are spaced equally apart from one another in the array. Each cavity 191 is adapted to receive a portion of a strap 125, such as first end 129 or second end 131, therein. As shown, each cavity 191 is oriented such that, when a strap 125 is installed therein, central plane 147 of strap 125 is inclined relative to blade plane of rotation 121. It should be appreciated that retention device 189 is not limited to the illustrated orientation of cavities 191, and thus the angle formed between central plane 147 of strap 125 and blade plane of rotation 121. It should further be appreciated that while plurality of cavities 191 are oriented identically relative to blade plane of rotation 121, that the configuration of retention device 189 is not so limited. For example, retention device 189 may be alternatively configured such that one or more cavities 191 form different angles, relative to each other, between central plane 147 of strap 125 and blade plane of rotation 121. It should further be appreciated that, alternatively, cavities 191 may be unequally spaced from one another in the array.

Retention device 189 comprises a first plate 193 and a second plate 195 that cooperate to form cavities 191. First plate 193 and second plate 195 are adapted to be carried by rotor mast 117 of rotor 109 for coaxial rotation therewith about mast axis 119. In particular, first plate 193 and second plate 195 define respective portions of an aperture 197. Aperture 197 is sized so that retention device 189 is coaxial with mast axis 119 when first plate 193 and second plate 195 are installed on rotor mast 117.

Each cavity 191 is configured to receive a fastener, for example a clevis pin 192, that extends therethrough for retaining strap 125 in place within cavity 191. In this embodiment, first plate 193 and second plate 195 define respective pairs of openings 199 located on opposed sides of each cavity 191. As shown, cavities 191 are open to aperture 197. Retention device 189 may alternatively be referred to as a retention component. It should be appreciated that retention device 189 is not limited to the configurations of first plate 193 and second plate 195 illustrated and described herein.

Straps 125 are depicted in inserted positions relative to cavities 191. More specifically, first end 129 of each strap 125 is inserted in a corresponding cavity 191 such that first grommet 145a is aligned with respective openings 199 such that a fastener may be received therethrough to retain strap 125 within retention device 189. Second ends 131 of straps 125 may be inserted in hollow portions 173 of blades 111 (for example as shown in FIGS. 7 and 10) such that second grommet 145b is aligned with the complementary openings that extend through blade grip 151, pitch horn 149, and hollow portion 173 such that a fastener may be received therethrough to retain strap 125 in place. Retention device 189 may be provided, along with a plurality of straps 125, as a rotor blade retention assembly of aircraft 101.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A propulsor for an aircraft, the propulsor comprising:
   a duct;
   a plurality of blades;
   a retention component comprising a body having a plurality of protrusions that extend outward from a central portion of the body, each protrusion defining a cavity;
   a plurality of tension-torsion straps, each tension-torsion strap coupling one of the blades to one of the protrusions and including a radially inner first end and a radially outer second end;
   wherein each cavity fixedly receives the first end of one of the tension-torsion straps and orients the respective first end so that it is carried within the respective cavity and a central plane of each tension-torsion strap is inclined relative to a blade plane of rotation defined by the plurality of blades, the second end of each tension-torsion strap being capable of being rotated relative to the respective first end; and
   wherein a fastener extends through each protrusion, cavity, and first end for retaining the respective tension-torsion strap in place within the respective cavity.

2. The propulsor of claim 1, wherein the central portion of the body is carried by a rotor mast of the propulsor for coaxial rotation therewith about a mast axis.

3. The propulsor of claim 1, wherein the central portion of the body comprises a rotor mast of the aircraft.

4. A rotor assembly for use in an aircraft, the assembly comprising:
   a plurality of rotor blades;
   a tension-torsion strap for each blade, each tension-torsion strap including a radially inner end and a radially outer end;
   a blade retention device with a body having a plurality of protrusions that extend outward from a central portion of the body, each protrusion defining an elongated cavity sized for receiving the radially inner end of one of the tension-torsion straps, the radially inner end of the associated tension-torsion strap being carried within the cavity;
   wherein each cavity is oriented such that, when the radially inner end of the tension-torsion strap is received therein, a central plane of the tension-torsion strap is inclined relative to a blade plane of rotation defined by the plurality of blades; and
   wherein a fastener extends through each protrusion, cavity, and inner end for retaining the respective tension-torsion strap in place within the respective cavity.

5. The rotor assembly of claim 4, wherein the central portion of the body defines an aperture adapted to receive a portion of a rotor mast of the aircraft.

6. The rotor assembly of claim 4, wherein the central portion of the body comprises a rotor mast of the aircraft.

7. A rotor blade retention assembly for use in an aircraft having a plurality of blades, the retention assembly comprising:
   a plurality of tension-torsion straps, each tension-torsion strap including a radially inner end and a radially outer end; and
   a retention component that comprises a body having a plurality of protrusions that extend outward from a central portion of the body and an array of cavities, each protrusion defining a respective one of the cavities, and each cavity adapted to fixedly receive therein the radially inner end of one of the plurality of tension-torsion straps, the radially inner end of each tension-torsion strap being carried within the associated cavity;
   wherein each cavity is oriented such that, when the radially inner end of the tension-torsion strap is received therein, a central plane of the tension-torsion strap is inclined relative to a blade plane of rotation defined by the plurality of blades; and
   wherein a fastener extends through each protrusion, cavity, and inner end for retaining the respective tension-torsion strap in place within the respective cavity.

8. The rotor blade retention assembly of claim 7, wherein the central portion of the body defines an aperture adapted to receive a portion of a rotor mast of the aircraft for coaxial rotation therewith about a mast axis.

9. The rotor blade retention assembly of claim 8, wherein the body is adapted to create an interference fit with the rotor mast of the aircraft with the rotor mast received in the aperture.

10. The rotor blade retention assembly of claim 7, wherein the central portion of the body comprises a rotor mast of the aircraft.

* * * * *